(12) United States Patent
Shinohara

(10) Patent No.: US 12,420,538 B2
(45) Date of Patent: Sep. 23, 2025

(54) TRANSFER SHEET FOR FORMING RECESSED AND PROJECTING SHAPE, METHOD OF PRODUCING TRANSFER SHEET FOR FORMING RECESSED AND PROJECTING SHAPE, AND METHOD OF FORMING RECESSED AND PROJECTING SHAPE

(71) Applicant: O-WELL CORPORATION, Osaka (JP)

(72) Inventor: Ryoko Shinohara, Osaka (JP)

(73) Assignee: O-WELL CORPORATION, Osaka (JP)

( * ) Notice: Subject to any disclaimer, the term of this patent is extended or adjusted under 35 U.S.C. 154(b) by 57 days.

(21) Appl. No.: 18/042,866

(22) PCT Filed: Aug. 28, 2020

(86) PCT No.: PCT/JP2020/032667
§ 371 (c)(1),
(2) Date: Feb. 24, 2023

(87) PCT Pub. No.: WO2022/044275
PCT Pub. Date: Mar. 3, 2022

(65) Prior Publication Data
US 2023/0321967 A1    Oct. 12, 2023

(51) Int. Cl.
*B32B 37/00* (2006.01)
*B32B 3/30* (2006.01)
(Continued)

(52) U.S. Cl.
CPC .............. *B32B 37/025* (2013.01); *B32B 3/30* (2013.01); *B32B 27/28* (2013.01); *B32B 27/306* (2013.01); *B32B 2307/7166* (2013.01)

(58) Field of Classification Search
CPC ......... B32B 37/025; B32B 3/30; B32B 27/28; B32B 27/306; B32B 2307/7166;
(Continued)

(56) References Cited

U.S. PATENT DOCUMENTS 4,481,326 A    11/1984    Sonenstein

FOREIGN PATENT DOCUMENTS

JP    2004-17610 A    1/2004
JP    2005-60636 A    3/2005
(Continued)

OTHER PUBLICATIONS

Machine Translation WO 2018034177 (Year: 2018).*
(Continued)

*Primary Examiner* — George R Koch
*Assistant Examiner* — Christopher C Caillouet
(74) *Attorney, Agent, or Firm* — Saliwanchik, Lloyd & Eisenschenk

(57) ABSTRACT

[Object] To shorten the work time in the step of forming a water-insoluble resin layer having a recessed and projecting shape on a to-be-transferred body.
[Solving Means] A transfer sheet (10) for forming a recessed and projecting shape includes: a water-soluble resin layer (20) that is formed of a water-soluble resin whose dissolving time in distilled water at 25° C. is 0.2 s/μm or more and 1.0 s/μm or less and includes recesses and projections on a first surface thereof; and a water-insoluble resin layer (30) that is stacked on the first surface.

20 Claims, 5 Drawing Sheets

(51) Int. Cl.
*B32B 27/28* (2006.01)
*B32B 27/30* (2006.01)

(58) Field of Classification Search
CPC . B32B 2255/10; B32B 2405/00; B32B 27/10; B32B 2255/28; B32B 2307/518; B32B 27/36; B32B 2255/26; B32B 2307/718; C08J 7/042; C08J 7/0427; C08J 2339/06; C08J 2433/08; C08J 2475/00; C08J 2329/04; C08L 29/04; C09D 129/04; C09D 175/04
See application file for complete search history.

(56) References Cited

FOREIGN PATENT DOCUMENTS

| | | | |
|---|---|---|---|
| JP | 2005-238674 A | 9/2005 |
| JP | 2013-6409 A | 1/2013 |
| JP | 2014-43036 A | 3/2014 |
| JP | 2014-77121 A | 5/2014 |
| JP | 2014-193551 A | 10/2014 |
| JP | 2017-82172 A | 5/2017 |
| JP | 2018-27510 A | 2/2018 |
| JP | 2018-158578 A | 10/2018 |
| JP | 2019-64098 A | 4/2019 |
| JP | 6511612 B2 | 4/2019 |
| JP | 2020-66666 A | 4/2020 |
| TW | 201228831 A1 | 7/2012 |
| WO | 2010/061790 A1 | 6/2010 |

OTHER PUBLICATIONS

PE2E WO 201804866 (Year: 2018).*
Office Action dated Mar. 27, 2024 in Japanese Application No. 2022-545213.
International Search Report dated Nov. 10, 2020 in International Application No. PCT/JP2020/032667.
Office Action dated May 23, 2024 in Chinese Application No. 202080103601.9.
Supplementary European Search Report dated Apr. 25, 2024 in European Application No. 20951525.3.
Office Action dated Jan. 26, 2025 in Chinese Application No. 202080103601.9.
Office Action dated Feb. 12, 2025 in Singapore Application No. 11202301256V.
Office Action dated Oct. 31, 2024 in Chinese Application No. 202080103601.9.
Office Action dated Oct. 22, 2024 in Japanese Application No. 2022-545213.
Office Action dated May 12, 2025 in Chinese Application No. 202080103601.9.
Office Action dated Jun. 10, 2025 in European Application No. 20 951 525.3.

* cited by examiner

TRANSFER SHEET FOR FORMING RECESSED AND PROJECTING SHAPE, METHOD OF PRODUCING TRANSFER SHEET FOR FORMING RECESSED AND PROJECTING SHAPE, AND METHOD OF FORMING RECESSED AND PROJECTING SHAPE

CROSS-REFERENCE TO RELATED APPLICATIONS

This application is the U.S. national stage application of International Patent Application No. PCT/JP2020/032667, filed Aug. 28, 2020, the disclosure of which is incorporated herein by reference in its entirety.

TECHNICAL FIELD

The present invention relates to a transfer sheet for forming a recessed and projecting shape suitable for forming a coating layer having recesses and projections on, for example, an airframe surface of an aircraft or a body surface of an automobile, a method of producing the transfer sheet for forming a recessed and projecting shape, and a method of forming a recessed and projecting shape.

BACKGROUND ART

It is known that forming a recessed and projecting shape on an aircraft an airframe surface of an aircraft, a body surface of an automobile, or the like, reduces the resistance of fluid flowing on the surface and improves the fuel efficiency. Examples of the recessed and projecting shape include a shark skin shape and a riblet.

The present inventors have proposed a technology in which a transfer sheet obtained by stacking a water-soluble resin layer and a coating material layer is directly attached to an airframe surface of an aircraft or a body surface of an automobile and the surface is washed with water to expose a recessed and projecting shape formed of the coating material layer on the surface (see Patent Literature 1). With this technology, it is possible to transfer a desired recessed and projecting shape to a to-be-transferred body without being affected by the shape of the to-be-transferred body.

CITATION LIST

Patent Literature

Patent Literature 1: Japanese Patent No. 6511612

DISCLOSURE OF INVENTION

Technical Problem

In the technology described in Patent Literature 1, for example, in the case where such a transfer sheet is used to form a recessed and projecting shape on an airframe surface of an aircraft, a large-scale device is unnecessary and there is an advantage that a precise shape can be formed even on a curved surface with high accuracy. Meanwhile, there is a demand for shortening the washing work time required for washing with water.

In view of the circumstances as described above, it is an object of the present invention to provide a transfer sheet for forming a recessed and projecting shape, which is capable of shortening the washing work time in a step of forming a water-insoluble resin layer having a recessed and projecting shape in a to-be-transferred body and inhibiting cracking in a step of producing the transfer sheet, a method of producing such a transfer sheet for forming a recessed and projecting shape, and a method of forming the recessed and projecting shape.

Solution to Problem

In order to achieve the above-mentioned object, a transfer sheet for forming a recessed and projecting shape according to the present invention includes: a water-soluble resin layer that is formed of a water-soluble resin whose dissolving time in distilled water at 25° C. is 0.2 s/μm or more and 1.0 s/μm or less and includes recesses and projections on a first surface thereof; and a water-insoluble resin layer that is stacked on the first surface.

In the step of forming a water-insoluble resin layer having a recessed and projecting shape in a to-be-transferred body, the transfer sheet is attached to a surface of the to-be-transferred body and then a water-soluble resin layer is removed by washing the surface with water to expose a recessed and projecting shape formed by the water-insoluble resin layer on the surface. In the present invention, since the water-soluble resin layer has a dissolving time of 0.2 s/μm or more in distilled water at 25° C., it is possible to shorten the washing work time during the washing with water described above. Meanwhile, since the water-soluble resin has a dissolving time of 1.0 s/μm or less in distilled water at 25° C., it is possible to inhibit cracking in the step of forming the transfer sheet.

In the transfer sheet for forming a recessed and projecting shape according to the present invention, the water-soluble resin contains polyvinylalcohol and polyvinylpyrrolidone, and a total mass of polyvinylalcohol and polyvinylpyrrolidone is favorably 40 mass % or more and less than 100 mass % with respect to a total amount of the water-soluble resin, and more favorably 50 mass % or more and 98 mass % or less. This is because the film strength at room temperature is reduced and the workability for recesses and projections decreases when the total mass is less than 40 mass %. Further, this is because the film strength during heating is reduced when the total mass is 100 mass %.

In the transfer sheet for forming a recessed and projecting shape according to the present invention, the water-soluble resin favorably has a degree of polymerization of polyvinylalcohol of 250 or more and 1000 or less, and more favorably 300 or more and 800 or less. This is because the hygroscopicity at room temperature increases when the degree of polymerization of polyvinylalcohol is less than 250. Further, this is because solubility is reduced when the degree of polymerization of polyvinylalcohol exceeds 1000.

Further, the water-soluble resin favorably has a degree of polymerization of polyvinylpyrrolidone of 100 or more and 2000 or less, and more favorably 200 or more and 1000 or less. This is because hygroscopicity at room temperature increases when the degree of polymerization of polyvinylpyrrolidone is less than 100. Further, this is because the solubility is reduced and the workability for recesses and projections decreases when the degree of polymerization of polyvinylpyrrolidone exceeds 2000.

In the transfer sheet for forming a recessed and projecting shape according to the present invention, the water-soluble resin favorably has a mass ratio of polyvinylalcohol to polyvinylpyrrolidone in a range of 80:20 to 20:80, and more favorably in a range of 70:30 to 30:70. This is because the solubility is reduced when the mass ratio of polyvinylalcohol is high. Further, this is because hygroscopicity increases when the mass ratio of polyvinylpyrrolidone is high.

In the transfer sheet for forming a recessed and projecting shape according to the present invention, the water-soluble resin favorably has a degree of saponification of the polyvinylalcohol of 70% or more and 99% or less, and more favorably 80% or more and 90% or less. This is because the film strength is reduced and the recessed and projecting shape cannot be maintained when the degree of saponification is less than 70%. Further, this is because the solubility is reduced, i.e., it is difficult to dissolve when the degree of saponification exceeds 99%.

In the transfer sheet for forming a recessed and projecting shape according to the present invention, the water-soluble resin layer favorably contains a latex or a plasticizer.

In the case where the water-soluble resin layer contains a latex or a plasticizer, it is possible to transfer a recessed and projecting shape with high accuracy when a heating recessed/projecting roller is typically used to process a recessed and projecting shape on the first surface of the water-soluble resin layer.

In the transfer sheet for forming a recessed and projecting shape according to the present invention, the water-soluble resin layer favorably contains 2 mass % or more and 50 mass % or less of a latex and favorably contains 5 mass % or more and 40 mass % or less of a latex. This is because the film strength is reduced during heating when the water-soluble resin layer contains less than 2 mass % of a latex. Further, this is because the film strength at room temperature is reduced and the workability for recesses and projections decreases when the water-soluble resin layer contains more than 50 mass % of a latex.

The plasticizer contained in the water-soluble resin layer is typically a high-boiling alcohol, and may be contained in an amount smaller than that of the latex. In the transfer sheet for forming a recessed and projecting shape according to the present invention, the water-soluble resin layer favorably contains 2 mass % or more and 10 mass % or less of a plasticizer and more favorably contains 3 mass % or more and 8 mass % or less of a plasticizer. This is because the film strength is reduced during heating when the water-soluble resin layer contains less than 2 mass % of a plasticizer. Further, this is because the film strength at room temperature is reduced and the workability for recesses and projections decreases when the water-soluble resin layer contains more than 10 mass % of a plasticizer.

The transfer sheet for forming a recessed and projecting shape according to the present invention is favorably a long sheet wound into a roll. This makes it less bulky and easier to transport and preserve. Further, the exposed area of the transfer sheet for forming a recessed and projecting shape is reduced and moisture is less likely to be absorbed inside the sheet from the sheet surface.

The transfer sheet for forming a recessed and projecting shape according to the present invention further includes a support layer stacked on a surface of the water-soluble resin layer opposite to the first surface, and a peel strength between the support layer and the water-soluble resin layer is favorably 2 g/cm or more and 70 g/cm or less. In the case where the peel strength is less than 2 g/cm, they are peeled during handling. In the case where the peel strength exceeds 70 g/cm, they cannot be easily peeled before washing work.

The transfer sheet for forming a recessed and projecting shape according to the present invention favorably further includes a sliding layer on a surface of the support layer opposite to a surface that is in contact with the water-insoluble resin layer. In the case where the transfer sheet for forming a recessed and projecting shape includes a sliding layer, a spatula, a rubber spatula, or the like can be efficiently slid when the transfer sheet is attached to a to-be-transferred body, and it is possible to inhibit wrinkles and air pockets from occurring.

The transfer sheet for forming a recessed and projecting shape according to the present invention may further include an adhesive layer stacked on a surface of the water-insoluble resin layer on a side opposite to a surface thereof facing the first surface of the water-soluble resin layer. As a result, it is possible to further shorten the work time.

In the transfer sheet for forming a recessed and projecting shape according to the present invention, the water-insoluble resin layer is formed of a coating liquid dissolved in a solvent, typically a coating material. By using the coating liquid, it is easier to adjust the penetrability into recesses and projections on the first surface of the water-soluble resin in accordance with the resin composition, the viscosity, and the application method.

In the transfer sheet for forming a recessed and projecting shape according to the present invention, the water-insoluble resin layer is favorably formed of polyurethane or an acrylic resin. By using polyurethane or an acrylic resin, it is possible to improve the strength and durability of the water-insoluble resin layer and reduce the cost.

In the transfer sheet for forming a recessed and projecting shape according to the present invention, the water-insoluble resin layer is favorably formed of a resin obtained by curing a UV curable resin composition. By using the resin obtained by curing a UV curable resin composition, it is easy to adjust the viscosity, and it is possible to transfer a recessed and projecting shape with higher accuracy. Further, it is possible to enhances the strength of the recessed and projecting shape.

A method of producing the transfer sheet for forming a recessed and projecting shape according to the present invention includes the steps of: preparing a water-soluble resin layer that is formed of a water-soluble resin whose dissolving time in distilled water at 25° C. is 0.2 s/µm or more and 1.0 s/µm or less and includes recesses and projections on a first surface thereof; forming a water-insoluble resin layer on the first surface. In the present invention, a water-insoluble resin layer may be formed in a to-be-transferred body and then a water-insoluble resin layer may be formed on the first surface.

It is favorable that in the method of producing a transfer sheet for forming a recessed and projecting shape according to the present invention, the step of preparing a water-soluble resin layer that includes recesses and projections on a first surface thereof includes a step of feeding a roll-shaped water-soluble resin sheet forming the water-soluble resin layer and a step of transferring recesses and projections to a first surface of the fed water-soluble resin sheet using a heating recessed/projecting roller.

It is favorable that the method of producing a transfer sheet for forming a recessed and projecting shape according to the present invention further includes a step of winding, after forming a water-insoluble resin layer on the first surface, the transfer sheet for forming a recessed and projecting shape into a roll.

In the method of producing a transfer sheet for forming a recessed and projecting shape according to the present invention, the water-insoluble resin layer may be formed of a coating material, and the step of forming a water-insoluble resin layer on a first surface thereof may include a step of stacking a coating liquid of the coating material on the first surface and a step of drying the coating liquid to form a coating material layer on a first surface of the water-soluble resin layer.

In the method of producing a transfer sheet for forming a recessed and projecting shape according to the present invention, the water-insoluble resin layer may be formed of a resin obtained by curing a UV curable resin composition and the step of forming a water-insoluble resin layer on a first surface thereof may include a step of stacking a coating liquid of the UV curable resin composition on the first surface and a step of curing the coating liquid to form a resin obtained by curing the UV curable resin composition on a first surface of the water-soluble resin layer.

A method of forming a recessed and projecting shape according to the present invention includes the steps of: attaching any of the transfer sheets for forming a recessed and projecting shape on a side of the water-insoluble resin layer to a surface of a to-be-transferred body; and removing the water-soluble resin layer of the transfer sheet for forming a recessed and projecting shape attached to the surface of the to-be-transferred body to leave the water-insoluble resin layer on the surface of the to-be-transferred body and expose a recessed and projecting shape formed by the water-insoluble resin layer on the surface of the to-be-transferred body.

Advantageous Effects of Invention

In accordance with the present invention, it is possible to shorten the washing work time in the step of forming a water-insoluble resin layer having a recessed and projecting shape on a to-be-transferred body and inhibit cracking in the step of producing the transfer sheet.

MODE(S) FOR CARRYING OUT THE INVENTION

Hereinafter, an embodiment of the present invention will be described with reference to the drawings.

Configuration of Transfer Sheet for Forming Recessed and Projecting Shape

Figure 1:
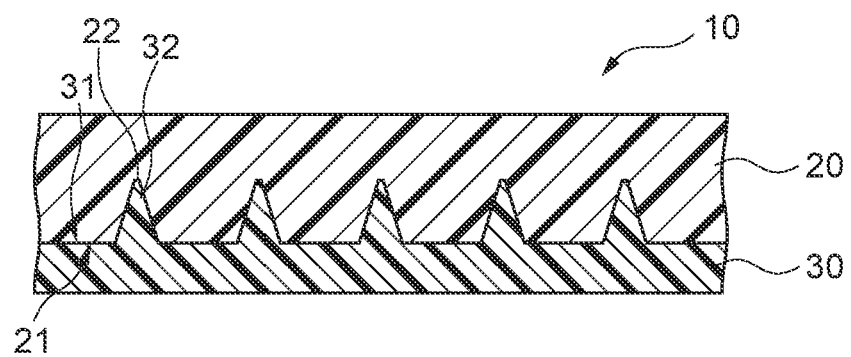
FIG. 1 is a cross-sectional view of a transfer sheet for forming a recessed and projecting shape according to an embodiment of the present invention.

FIG. 1 is a cross-sectional view of a transfer sheet for forming a recessed and projecting shape according to an embodiment of the present invention.

As shown in FIG. 1, a transfer sheet for forming a recessed and projecting shape 10 includes a water-soluble resin layer 20 and a water-insoluble resin layer 30.

The transfer sheet for forming a recessed and projecting shape 10 is used to, for example, form the water-insoluble resin layer 30 formed of a coating material that functions as a riblet on the surface of the airframe of an aircraft or the surface of the body of an automobile. However, the transfer sheet for forming a recessed and projecting shape according to the present invention is not necessarily need to be used to form a riblet, and the use thereof is not limited as long as it is used to form a recessed and projecting shape.

Water-Soluble Resin Layer

The water-soluble resin layer 20 is formed of a water-soluble resin whose dissolving time in distilled water at 25° C. is 0.2 s/μm or more and 1.0 s/μm or less and includes recesses and projections 22 on a first surface 21. The water-soluble resin more favorably has a dissolving time in distilled water at 25° C. of 0.5 s/μm or more and 0.6 s/μm or less.

The dissolving time here is a dissolving time per unit film thickness of the water-soluble resin layer. After measuring the thickness of the water-soluble resin layer of 2 cm square fixed to a jig, 800 ml of distilled water was placed in a 1 L beaker, and the time from immersion of the water-soluble resin layer together with the jig in the distilled water stirred with a stirrer (600 rpm) while maintaining 25° C. to dissolution was measured. The dissolution here means a state of insoluble fine particles having a diameter of 1 mm or less.

Polyvinylalcohol, polyvinylpyrrolidone, and/or gelatin can be used for the water-soluble resin, and polyvinylalcohol and polyvinylpyrrolidone are favorable of these. Further, a combination of polyvinylalcohol and polyvinylpyrrolidone is particularly favorable in terms of a dissolving time, workability for recesses and projections, and film strength.

The water-soluble resin has a total mass of polyvinylalcohol and polyvinylpyrrolidone of 40 mass % or more and less than 100 mass %. The water-soluble resin favorably more favorably has a total amount of polyvinylalcohol and polyvinylpyrrolidone of 50 mass % or more and 98 mass % or less.

The water-soluble resin has a degree of polymerization of polyvinylalcohol of 250 or more and 1000 or less and a degree of polymerization of polyvinylpyrrolidone of 100 or more and 2000 or less.

The water-soluble resin has a mass ratio of polyvinylalcohol to polyvinylpyrrolidone in the range of 80:20 to 20:80.

The water-soluble resin more favorably has a mass ratio of polyvinylalcohol to polyvinylpyrrolidone in the range of 70:30 to 30:70.

The water-soluble resin may contain, in addition to a composition including polyvinylalcohol and polyvinylpyrrolidone, a latex (a styrene-butadiene latex, an acrylate latex), a plasticizer (glycerin, diglycerin, trimethylolpropane, polyethylene glycol), another water-soluble polymer (an unmodified PVA resin, a modified PVA resin other than anionic group modification, sodium polyacrylate, polyethylene oxide, polyvinylpyrrolidone, dextrin, chitosan, chitin, methyl cellulose, hydroxyethyl cellulose, etc.), a flavoring agent, a rust inhibitor, a coloring agent, a bulking agent, an antifoaming agent, an ultraviolet absorber, and the like.

The water-soluble resin layer 20 contains a latex or a plasticizer. As a result, it is possible to inhibit the occurrence of cracking during processing of a recessed and projecting shape. This water-soluble resin layer 20 favorably contains 2 mass % or more and 50 mass % or less of a latex and favorably contains 5 mass % or more and 40 mass % or less of a latex.

The water-soluble resin layer 20 may contains a plasticizer instead of a latex. The plasticizer is typically a high-boiling alcohol and may be contained in an amount smaller than that of the latex. This water-soluble resin layer 20 favorably contains 2 mass % or more and 10 mass % or less of the plasticizer and favorably contains 3 mass % or more and 8 mass % or less of the plasticizer.

The water-soluble resin layer 20 is favorably thicker than the peak height of the recesses and projections 22. Typically, the water-soluble resin layer 20 has a thickness of 50 µm or more and 250 µm or less and more favorably has a thickness of 80 µm or more and 200 µm or less. At this time, the peak height of the recesses and projections 22 is 10 µm or more and 150 µm or less. In the case where the thickness of the water-soluble resin layer is less than 50 µm, an accurate recessed portion cannot be formed in some cases. In the case where the thickness of the water-soluble resin layer exceeds 200 µm, it takes too long to remove the water-soluble resin sheet by washing.

Support for Water-Soluble Resin Layer

Figure 2:
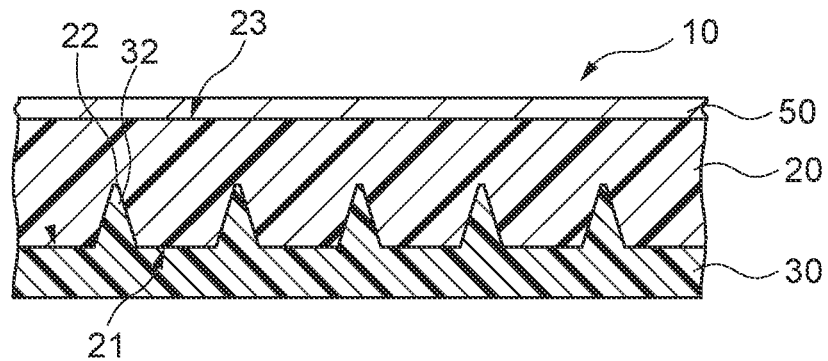
FIG. 2 is a cross-sectional view of a transfer sheet for forming a recessed and projecting shape according to another embodiment of the present invention.

As shown in FIG. 2, a support layer 50 may be provided as necessary on a surface 23 of the water-soluble resin layer 20 on the side opposite to the first surface 21 on which the water-insoluble resin layer 30 is stacked. A known resin film, paper, coated paper, or the like can be used for the support layer 50. This makes it possible to inhibit the dimension of the water-soluble resin from deforming and inhibit the water-soluble resin from being damaged. The thickness of the support layer 50 is favorably 20 µm or more and 200 µm or less.

Further, surface treatment (not shown) for adjusting the adhesion between the support layer 50 and the water-soluble resin layer 20 may be performed on the support layer 50. As the surface treatment, corona treatment, primer treatment, adhesive treatment, anchor treatment, or the like can be used. The peel strength between the support layer and the water-soluble resin layer is 2 g/cm or more and 70 g/cm or less, and more favorably 20 g/cm or more and 50 g/cm or less.

Sliding Layer of Support for Water-Soluble Resin Layer

Further, in the case where the support layer includes a resin film, a layer (not shown) for improving slippage may be provided as necessary on the surface of the support layer 50 on the side opposite to the surface thereof facing the water-soluble resin layer 20. The layer may be formed by, for example, applying a coating liquid of an acrylic polymer containing fine particles and the like to have a thickness of 2 to 30 µm or attaching paper or coated paper.

Water-Insoluble Resin Layer

The water-insoluble resin layer 30 is stacked on the first surface 21 of the water-soluble resin layer 20.

As the water-insoluble resin forming the water-insoluble resin layer 30, an alkyd resin-based, amino alkyd resin-based, acrylic resin-based, acrylic-urethane resin-based, polyurethane resin-based, epoxy resin-based, chlorinated rubber-based, olefin resin-based, UV curable, silicone resin-based, electron beam curable, silicon resin-based, petroleum-based, vinyl resin-based, phenolic resin-based, fluoropolymer-based, polyester resin-based, melamine resin-based, or lacquer-based one, or the like can be used. Further, using polyhedral oligosilsesquioxane (POSS)-modified polyurethane or a shame memory elastomer such as polyurethane, silicone, epoxy, polysulfide, ethylene propylene diene, fluorosilicone, and fluoroelastomer for the water-insoluble resin layer 30 has the advantage that it does not need to be deformed.

Among them, a polyurethane resin and an acrylic resin are particularly favorable from the viewpoint of the strength of the resin, durability, cost, and the like.

Polyurethane, Acrylic

Examples of the polyurethane resin include a reaction product of a polyol having a plurality of hydroxy groups and a polyisocyanate. Examples of the polyol include a polyester polyol, an acrylic polyol, an epoxy polyol, a polyether polyol, a hydroxyl-terminated polybutadiene, a polyolefin polyol, a polycarbonate polyol, and a hydroxyl-containing silicone resin. As the polyol, one having a hydroxyl value of approximately 200 to 800 mgKOH/g is favorable. As the isocyanate, an aromatic isocyanate, an aliphatic isocyanate, and an alicyclic isocyanate such as a 1,6-hexamethylene diisocyanate, a cyclobutane-1,3-diisocyanate, a cyclohexane-1,3-diisocyanate, an isophorone diisocyanate (IPDI), an isocyanatomethyloctylene diisocyanate (TTI), a 2,4-hexahydrotoluylenediisocyanate (H6TDI), a hexahydro-1,3-phenylene diisocyanate, a perhydro-2,4'-diphenylmethane diisocyanate (H12MDI), a 2-methylpentamethylene diisocyanate (MPDI), and a tetramethylxylylene diisocyanate (TXMDI) can be used. Among these, an aliphatic isocyanate is particularly favorable from the viewpoint of durability and mechanical properties of the resin. The molecular weight of the polyurethane resin is favorably approximately 1500 to 150000, and more favorably 2000 to 120000.

As the acrylic resin, a resin obtained by radical polymerization of an acrylic monomer, such as a methyl (meth)acrylate, an ethyl (meth)acrylate, a propyl (meth)acrylate, a butyl (meth)acrylate, a 2-ethylhexyl acrylate, a methoxyethylene glycol acrylate, an ethoxyethylene glycol acrylate, is used.

A hydroxy group, a carboxyl group, an epoxy group, or the like may be introduced into the acrylic resin according to the present invention, as necessary, by copolymerizing a 2-hydroxy (meth)acrylate, (meth)acrylic acid, a glycidyl (meth)acrylate, or the like.

The molecular weight of the alkyl resin is favorably approximately 1500 to 150000, and more favorably approximately 2000 to 120000.

UV Curable Resin

As the UV curable resin composition, a composition that is cured by ultraviolet rays to form a hydrophobic polymer and contains a curable monomer, a curable oligomer, a photopolymerization initiator, and a sensitizer or a solvent as necessary is used.

The viscosity of the UV curable resin composition is favorably 20 mPa·s or more and 1000 mPa·s or less, and more favorably 50 mPa·s or more and 800 mPa·s or less. In the case where the viscosity is less than 20 mPa·s, it is difficult to stack the UV curable resin composition in a liquid state in some cases. In the case where the viscosity exceeds 1000 mPa·s, the UV curable resin composition in a liquid state does not sufficiently enter the recessed portion of the water-soluble resin sheet in some cases.

The curable monomer/curable oligomer is a monomer or an oligomer having a functional group that is polymerizable by radicals or acids generated by an initiator. Examples of such a functional group include a vinyl group, a (meth)acryloyloxy group, a vinyloxy group, and an epoxy group. Among these, a (meth)acryloyloxy group is particularly favorable. These include a polyethylene glycol diacrylate, a propoxylated ethoxylated bisphenol A diacrylate (approximately 600 mPa·s), a 1, 10-decanediol diacrylate (approximately 10 mPa·s), a pentaerythritol triacrylate (approximately 800 mPa·s), an ethoxylated bisphenol A dimethacrylate (approximately 500 mPa·s), a tripropylene glycol diacrylate (approximately 10 mPa·s), a polyethylene glycol #400 dimethacrylate (approximately 35 mPa·s), a 2-hydroxy-3-acryloyloxypropyl methacrylate (approximately 45 mPa·s), a polyethylene glycol #200 diacrylate (approximately 20 mPa·s), an ethoxylated pentaerythritol tetraacrylate (approximately 350 mPa·s), an ethoxylated glycerin triacrylate (approximately 200 mPa·s), an ethoxylated bisphenol A diacrylate (approximately 1100 mPa·s), and an ethoxylated isocyanurate triacrylate (approximately 1000 mPa·s). These may be used alone or mixed and used.

As the photopolymerization initiator, a known one can be used. Examples of the photopolymerization initiator include a benzoin compound, a benzophenone compound, an acylphosphine oxide compound, an iodonium salt compound, and a sulfonium salt compound.

In the present invention, a known photosensitizer such as a xanthone compound and an anthracene compound may be used in combination as necessary.

As another material, a filler such as silica, a reactive diluent such as ethyl methacrylate and butyl methacrylate, an ultraviolet absorber, an antistatic agent, or the like may be added to the UV curable resin composition, as necessary.

In the present invention, a coating liquid (coating material) obtained by dissolving these resins in a solvent is stacked on the first surface 21 of the water-soluble resin layer 20. As the solvent, a known solvent such as toluene, xylene, methyl ethyl ketone, methyl isobutyl ketone, ethyl acetate, butyl acetate, and acetone can be used. Further, the above-mentioned resin may be used in the form of a latex to obtain a coating liquid using water as a dispersion medium.

In the coating liquid according to the present invention, it is favorable to use a cross-linking agent. As the cross-linking agent, a known one such as an isocyanate-based, epoxy-based, or oxazoline-based one can be used. An isocyanate-based cross-linking agent is favorable from the viewpoint of reactivity. As the isocyanate-based cross-linking agent, those described for the above-mentioned urethane resin can be used.

A known surfactant can be added to the coating liquid according to the present invention as necessary.

The solid content concentration of the coating liquid according to the present invention is not particularly limited, but is favorably approximately 5 mass % to 80 mass %.

Further, the viscosity of the coating liquid according to the present invention is also not particularly limited, but is favorably in the range of approximately 10 mP·s to 150 mP·s.

The water-insoluble resin layer 30 includes, on a second surface 31 facing the first surface 21 of the water-soluble resin layer 20, recesses and projections 32 corresponding to the recesses and projections 22 of the first surface 21 of the water-soluble resin layer 20, which are obtained by applying a coating liquid containing a water-insoluble resin and then drying the coating liquid.

The thickness of the water-insoluble resin layer 30 excluding the recesses and projections 32 is typically 5 μm to 70 μm.

The height of the recesses and projections 32 of the water-insoluble resin layer 30 is typically 10 μm or more and 150 μm or less, and more favorably 20 μm or more and 120 μm or less. The interval between the recesses and projections is typically 10 μm or more and 400 μm or less, and more favorably 20 μm or more and 300 μm or less. The width of the tip of each peak of the recesses and projections 32 is favorably 0 μm or more and 40 μm or less, and more favorably 0 μm or more and 30 μm or less.

The shape of each peak of the recesses and projections 32 is typically a triangle with an apex angle of 20° or more and 45° or less. The shape of each peak of the recesses and projections 32 may be another shape. The shape of the recesses and projections 32 is determined by the shape of the recesses and projections 22 of the water-soluble resin layer 20.

Adhesive Layer

Figure 4:
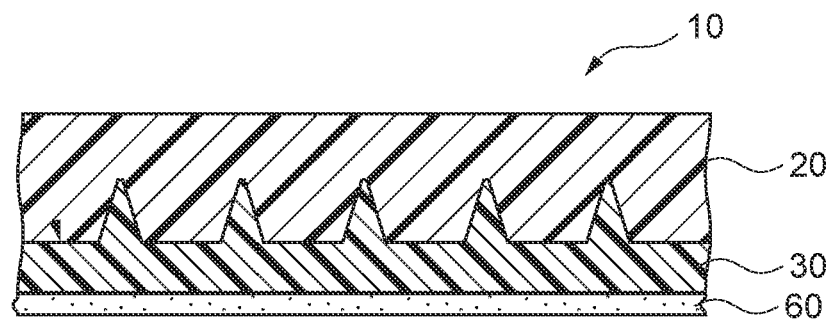
FIG. 4 is a cross-sectional view of a transfer sheet for forming a recessed and projecting shape according to another embodiment of the present invention.

Note that as shown in FIG. 4, an adhesive layer 60 may be provided as necessary on the surface of the water-insoluble resin layer 30 opposite to the surface of the water-insoluble resin layer 30 on the side of the water-soluble resin layer 20.

As the adhesive of the adhesive layer 60, a known one such as an acrylic-based, rubber-based, or silicone-based one can be used. The thickness of the adhesive layer 60 is favorably approximately 10 μm to 30 μm. A release film (not shown) is favorably attached to the surface of the adhesive layer 60 opposite to the surface thereof on the side of the water-insoluble resin layer 30.

Figure 5:
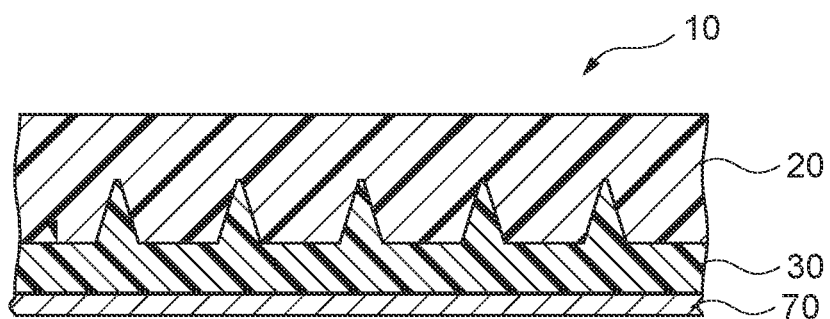
FIG. 5 is a cross-sectional view of a transfer sheet for forming a recessed and projecting shape according to still another embodiment of the present invention.

Further, as shown in FIG. 5, a base material 70 may be provided on the surface of the water-insoluble resin layer 30 opposite to the surface thereof on the side of the water-soluble resin layer 20. The base material 70 is not particularly limited as long as it has flexibility. For example, a known polymer sheet such as a polyester and a polyolefin can be used. Among them, polyethylene terephthalate is favorable in terms of strength and cost. The thickness of the base material 70 is not particularly limited, and can be, for example, approximately 20 μm to 100 μm. In order to improve adhesiveness, both surfaces of the base material 70 may be subjected to surface treatment such as corona treatment and flame treatment or may be provided with an undercoat layer such as an acrylic-based or urethane-based one. The base material 70 may be further provided with a decorative layer, a colored layer, or the like, or may be provided with a symbol, an identification mark, or the like, as necessary.

Figure 6:
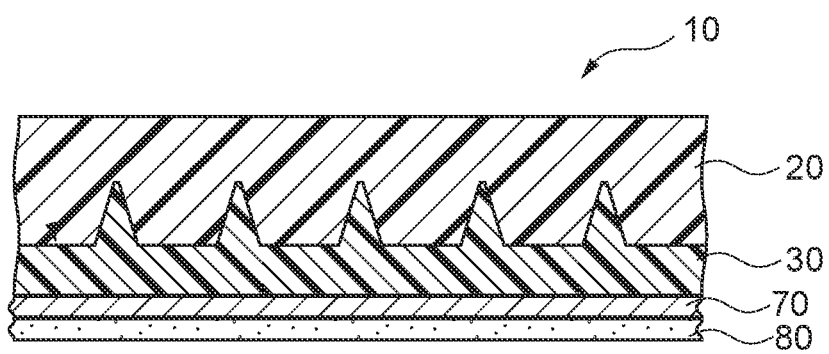
FIG. 6 is a cross-sectional view of a transfer sheet for forming a recessed and projecting shape according to still another embodiment of the present invention.

Further, as shown in FIG. 6, an adhesive layer 80 may be provided on the surface of the base material 70 opposite to the surface thereof on which the water-insoluble resin layer 30 is stacked. As the adhesive layer 80, a known one such as an acrylic-based, rubber-based, or silicone-based one can be used. The thickness of the adhesive layer 80 is favorably approximately 10 µm to 30 µm. It is favorable to attach a release film (not shown) to the surface of the adhesive layer 80 opposite to the surface thereof on the side of the base material 70.

Figure 3:
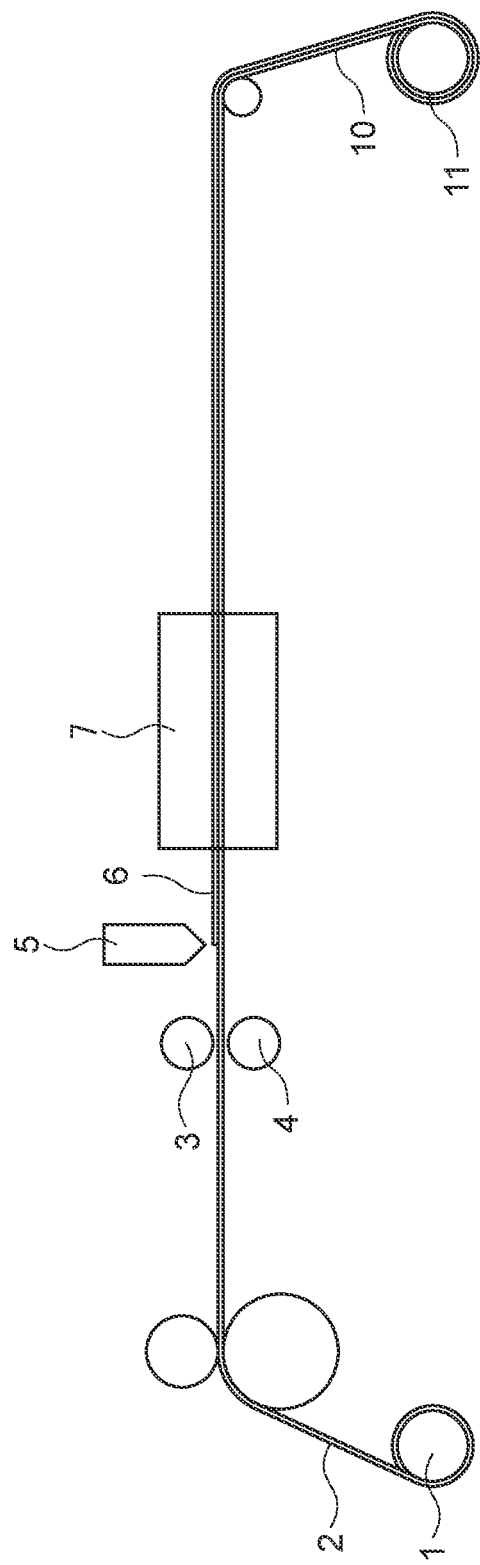
FIG. 3 is an explanatory diagram showing a step of producing the transfer sheet for forming a recessed and projecting shape according to the embodiment of the present invention.

Method of Producing Transfer Sheet for Forming Recessed and Projecting Shape FIG. 3 is an explanatory diagram showing a step of producing the transfer sheet for forming a recessed and projecting shape 10.

Method of Forming Water-Soluble Resin Layer

A supply roll 1 in which a water-soluble resin sheet 2 formed of a water-soluble resin whose dissolving time in distilled water at 25° C. is 0.2 s/µm or more and 1.0 s/µm or less is rolled is prepared.

Note that although the method of producing the water-soluble resin sheet 2 is not particularly limited, the water-soluble resin sheet 2 can be produced by, for example, a method of applying an aqueous solution containing polyvinylalcohol on the support layer 50 and then drying the aqueous solution. The application method is not particularly limited, and a known method such as a slide coater, a gravure coater, and a curtain coater can be used. The water-soluble resin sheet 2 may include only one layer or may include two or more layers. Further, the water-soluble resin sheet 2 may be formed by a method of preparing two sets of supports for a water-soluble resin sheet, which are coated with an aqueous solution containing polyvinylalcohol and then dried, attaching the respective coating layers to each other with a polyvinylalcohol-based adhesive, and then peeling off the supports for a water-soluble resin sheet. The water-soluble resin sheet may be one from which a support for a water-soluble resin sheet is removed or may be one having a support for a water-soluble resin sheet on one surface thereof.

Further, surface treatment (not shown) for adjusting the adhesion between the support layer 50 and the water-soluble resin layer 20 may be performed on the support layer 50. As the surface treatment, corona treatment, primer treatment, adhesive treatment, anchor treatment, or the like can be used. The peel strength between the support layer and the water-soluble resin layer is favorably 2 g/cm or more and 70 g/cm or less, and more favorably 20 g/cm or more 50 g/cm or less. In this case, there is no peeling during the formation of recesses and projections and processing in the subsequent steps.

Further, a layer (not shown) for improving slippage may be provided as necessary on the surface of the support layer 50 on the side opposite to the surface thereof facing the water-soluble resin layer 20, which may be provided in advance or after producing the transfer sheet for forming a recessed and projecting shape 10.

Method of Processing Recessed Portion

The water-soluble resin sheet 2 fed from the supply roll 1 is caused to travel between a heating recessed/projecting roller 3 and a pressure roller 4. As a result, recesses and projections formed on the surface of the heating recessed/projecting roller 3 are formed on a first surface of the water-soluble resin sheet 2. The water-soluble resin sheet 2 on which recesses and projections have been formed forms the water-soluble resin layer 20 shown in FIG. 1. That is, the water-soluble resin layer 20 that is formed of a water-soluble resin whose dissolving time in distilled water at 25° C. is 0.2 s/µm or more and 1.0 s/µm or less and includes recesses and projections on a first surface thereof is prepared. In the production method according to this embodiment, since the water-soluble resin layer 20 contains a latex or a plasticizer and the water-soluble resin layer 20 is formed of a water-soluble resin whose dissolving time in distilled water at 25° C. is 1.0 s/µm or less, it is possible to transfer, when forming a recessed and projecting shape using the heating recessed/projecting roller 3, the recessed and projecting shape with high accuracy.

Method of Forming Water-Insoluble Resin Layer

Hereinafter, a coating liquid (coating material) obtained by dissolving a water-insoluble resin in a solvent will be described as an example.

A coating material 6 is supplied from a coating material supplier 5 to the first surface of the water-soluble resin sheet 2 on which recesses and projections have been formed, thereby applying the coating material 6 to the first surface. The coating material 6 applied to the first surface of the water-soluble resin sheet 2 forms the water-insoluble resin layer 30 shown in FIG. 1. That is, a coating liquid is applied to the first surface. The application method is not particularly limited, and a known method such as a bar coater, a slide coater, a gravure coater, a curtain coater, and a die coater can be used. The wet application amount of the water-insoluble resin at this time is favorably approximately 10 g/m$^2$ or more and 200 g/m$^2$ or less.

The conditions for drying the coating liquid are not particularly limited, and a method of natural drying at room temperature, a method of drying by heating at approximately 40° C. to 150° C., or the like can be used. Further, it is also favorable to perform heat treatment at a temperature of approximately 40° C. to 80° C. for approximately 2 hours to 24 hours in order to promote the reaction of the cross-linking agent after drying.

For example, the water-soluble resin sheet 2 to which the coating material 6 has been applied is heated by a heating device 7 at 80 to 120° C. for 2 to 30 minutes. This heating evaporates the solvent of the coating material 6 to dry and cure the coating material 6. As a result, the transfer sheet for forming a recessed and projecting shape 10 in which the water-soluble resin layer 20 and the water-insoluble resin layer 30 are stacked, which are shown in FIG. 1, are produced. That is, the water-insoluble resin layer 30 is formed on the first surface of the water-soluble resin layer 20.

Note that a protective sheet (not shown) or the like may be attached to the water-insoluble resin layer 30 as necessary.

In the case where the water-insoluble resin layer is formed of polyurethane or an acrylic resin, a cured layer is formed by the above-mentioned heating. In the case where the water-insoluble resin layer is formed of a UV curable resin composition, the UV curable resin composition is cured by irradiation with ultraviolet rays to form a cured layer. In the method of forming a cured layer by irradiation with ultraviolet ray, since heating at a high temperature for a long time is unnecessary, the transfer sheet for forming a recessed and projecting shape is not damaged by heat.

The UV curable resin composition according to the present invention may be cured by irradiation with ultraviolet rays from the side of the UV curable resin composition or may be cured by irradiation with ultraviolet rays from the side of the water-soluble resin sheet. In the case where the base material 70 is provided, by irradiation with ultraviolet rays from the side of the water-soluble resin sheet, the side of the base material does not need to be transparent so that ultraviolet rays are transmitted therethrough, and it is possible to color the base material and freely stack an opaque layer on the base material. Further, in the case where the base material 70 is provided, a UV curable resin composition may be applied to the first surface of the water-soluble resin layer 20, the base material 70 may be stacked thereon, and then, ultraviolet rays may be applied. Alternatively, a UV curable resin composition may be applied to the base material 70, the first surface of the water-soluble resin layer 20 may be stacked thereon, and then, ultraviolet rays may be applied.

As a light source, a xenon lamp, a mercury lamp, a metal halide lamp, an ultraviolet LED lamp, or the like can be used. The application energy is desirably approximately 10 to 10000 mJ/cm$^2$ although depending on the type of polymerization initiator and the UV curable resin composition.

In the present invention, after curing with ultraviolet rays, heat treatment may be performed as necessary. The heating temperature and heating time are favorably approximately 100° C. to 200° C. for 10 minutes to 120 minutes. This heating further promotes the curing of the UV curable resin composition and improves the strength of the water-insoluble resin layer 30.

The transfer sheet for forming a recessed and projecting shape 10 that is the water-soluble resin sheet 2 on which the coating material 6 has been cured is wound into a roll. Forming a roll winding 11 makes the transfer sheet for forming a recessed and projecting shape 10 less bulky and easier to transport and preserve. Further, the exposed area of the transfer sheet for forming a recessed and projecting shape 10 is reduced, and moisture is less likely to be absorbed inside the sheet from the sheet surface. Meanwhile, since the water-soluble resin layer 20 is formed of a water-soluble resin whose dissolving time in distilled water at 25° C. is 1.0 s/μm or less, the water-soluble resin layer does not lose shape during the conveying or preservation.

Method of Forming Adhesive Layer

In the present invention, the adhesive layer 60 may be provided on the surface of the water-insoluble resin layer 30 of the transfer sheet for forming a recessed and projecting shape 10 opposite to the surface thereof that is in contact with the water-soluble resin layer. The method of stacking the adhesive layer is not particularly limited. For example, the adhesive layer may be stacked by a method of coating an adhesive on a hydrophobic polymer sheet and then heating and curing the adhesive at 80 to 150° C. for 1 to 30 minutes to be attached to the water-insoluble resin layer 30, or may be formed by a method of directly coating an adhesive on the water-insoluble resin layer 30.

Method of Forming Recessed and Projecting Shape on Surface of to-be-Transferred Body Hereinafter, a coating liquid (coating material) obtained by dissolving a water-insoluble resin in a solvent will be described as an example.

Figure 7A:
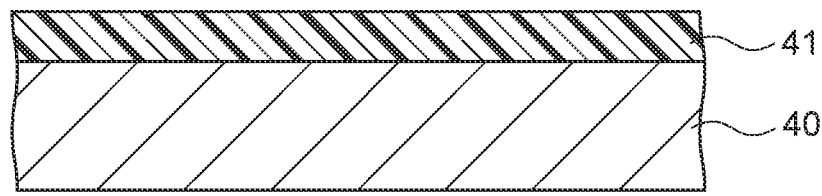
FIGS. 7(a)-7(c) are diagrams showing a step of forming a recessed and projecting shape on a to-be-transferred body using a transfer sheet for forming a recessed and projecting shape according to an embodiment of the present invention.
Figure 7B:
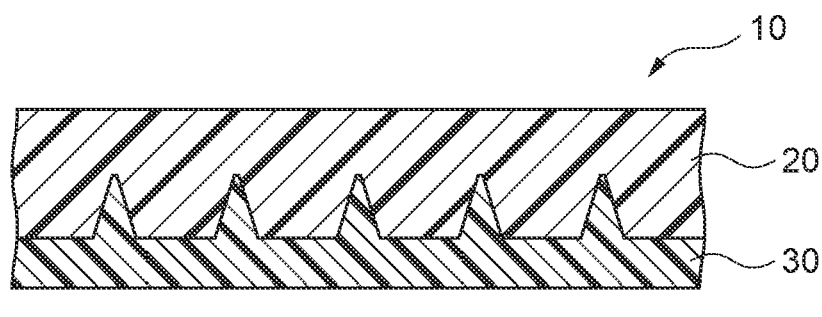
Figure 7C:
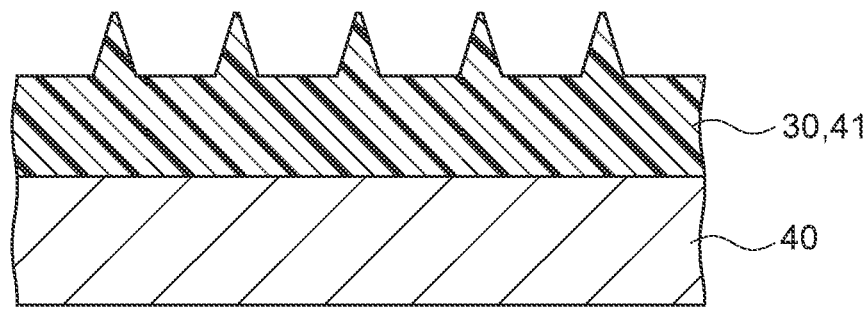

FIGS. 7(a)-7(c) are diagrams showing an example of a step of forming a recessed and projecting shape on a to-be-transferred body using the transfer sheet for forming a recessed and projecting shape 10.

A coating material 41 is applied to a surface of a to-be-transferred body 40 (FIG. 7(a)). It is favorable to use, for the coating material 41, the same material as that of the water-insoluble resin layer 30 of the transfer sheet for forming a recessed and projecting shape 10. However, the present invention is not limited to using the same material as that of the water-insoluble resin layer 30 for the coating material 41. For the coating material 41, an alkyd resin-based, amino alkyd resin-based, acrylic resin-based, acrylic-urethane resin-based, polyurethane resin-based, epoxy resin-based, chlorinated rubber-based, olefin resin-based, UV curable, silicone resin-based, electron beam curable, silicon resin-based, petroleum-based, vinyl resin-based, phenolic resin-based, fluoropolymer-based, polyester resin-based, melamine resin-based, or lacquer-based one, or the like can be used. A primer paint or the like may be used for the coating material 41.

The transfer sheet for forming a recessed and projecting shape 10 is attached to the surface of the to-be-transferred body 40 via the coating material 41 (FIG. 7(b)). The transfer sheet for forming a recessed and projecting shape 10 is disposed on the surface of the to-be-transferred body 40 such that the water-insoluble resin layer 30 of the transfer sheet for forming a recessed and projecting shape 10 and the coating material 41 are in contact with each other, and pressure is applied from the side of the water-soluble resin layer 20 of the transfer sheet for forming a recessed and projecting shape 10 to attach the transfer sheet for forming a recessed and projecting shape 10 to the surface of the to-be-transferred body 40. Typically, a sheet fed from the transfer sheet for forming a recessed and projecting shape 10 of the roll winding 11 is cut into a predetermined size, and the cut transfer sheet for forming a recessed and projecting shape 10 is attached to the surface of the to-be-transferred body 40.

The water-soluble resin layer 20 of the transfer sheet for forming a recessed and projecting shape 10 attached to the surface of the to-be-transferred body 40 is removed to leave the water-insoluble resin layer 30 on the surface of the to-be-transferred body 40 and expose a recessed and projecting shape formed by the water-insoluble resin layer 30 on the surface of the to-be-transferred body 40 (FIG. 7(c)). For the removal of the water-soluble resin layer 20, typically, an operator removes the water-soluble resin layer 20 by washing with water, i.e., water pressure by ejecting water from a hose to the surface of the transfer sheet for forming a recessed and projecting shape 10 attached to the surface of the to-be-transferred body 40. As a condition for washing with water, for example, warm water is favorably used, and a sponge, a brush, or the like may be used at that time. In the formation method according to this embodiment, since the water-soluble resin layer 20 is formed of a water-soluble resin whose dissolving time in distilled water at 25° C. is 0.2 s/μm or more, the water-soluble resin layer 20 can be removed in a shorter time during washing with water.

Note that the formation method according to the present invention is not limited to the aspect described above.

Figure 8:
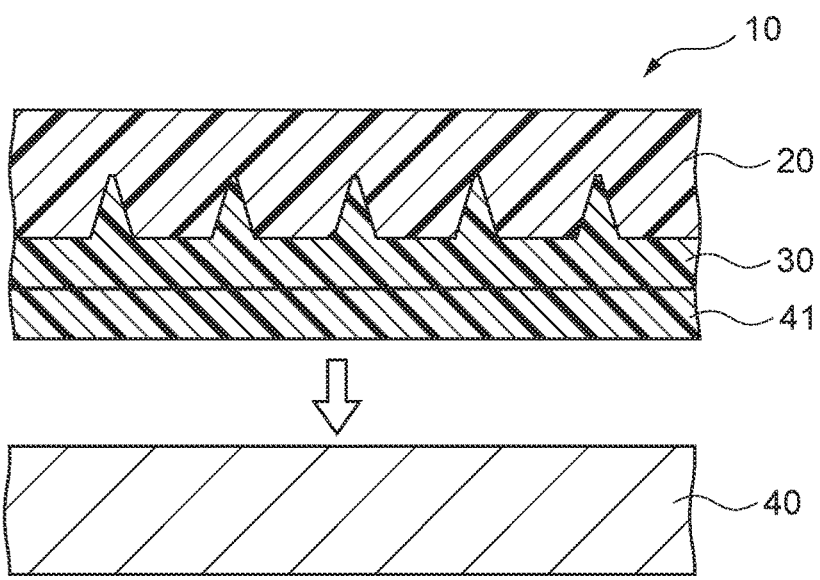
FIG. 8 is a diagram showing a step of forming a recessed and projecting shape on a to-be-transferred body using a transfer sheet for forming a recessed and projecting shape according to another embodiment of the present invention.

For example, as shown in FIG. 8, the coating material 41 is applied to the water-insoluble resin layer 30 of the transfer sheet for forming a recessed and projecting shape 10 instead of applying the coating material 41 to the surface of the to-be-transferred body 40, and then applied to the surface of the to-be-transferred body 40. After that, although not shown, the water-soluble resin layer 20 of the transfer sheet for forming a recessed and projecting shape 10 may be removed to leave the water-insoluble resin layer 30 on the surface of the to-be-transferred body 40 and expose a recessed and projecting shape formed by the water-insoluble resin layer 30 on the surface of the to-be-transferred body 40.

Figure 9:
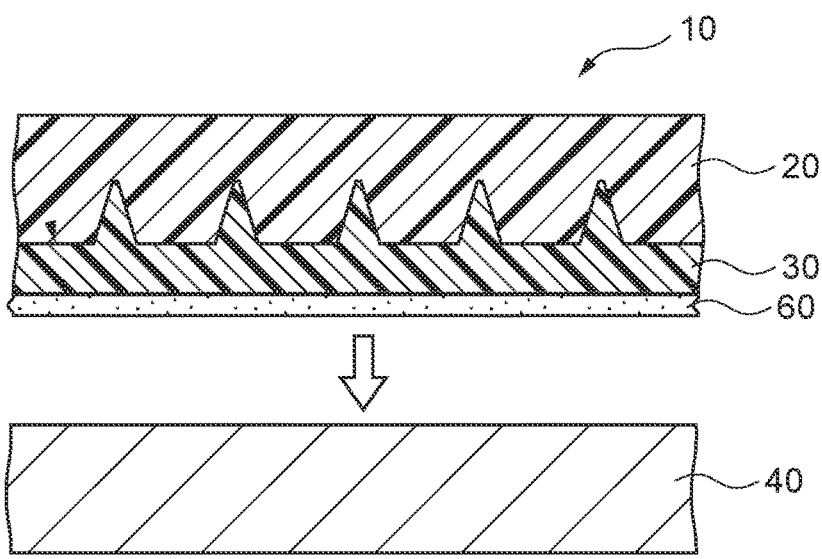
FIG. 9 is a diagram showing a step of forming a recessed and projecting shape on a to-be-transferred body using the transfer sheet for forming a recessed and projecting shape shown in FIG. 4.

Further, in the case where the transfer sheet for forming a recessed and projecting shape 10, which has the configuration shown in FIG. 4, is used, the adhesive layer 60 of the transfer sheet for forming a recessed and projecting shape 10 is directly attached to the surface of the to-be-transferred body 40, as shown in FIG. 9. After that, although not shown, the water-soluble resin layer 20 of the transfer sheet for forming a recessed and projecting shape 10 may be removed to leave the water-insoluble resin layer 30 on the surface of the to-be-transferred body 40 and expose a recessed and projecting shape formed by the water-insoluble resin layer 30 on the surface of the to-be-transferred body 40.

Figure 10:
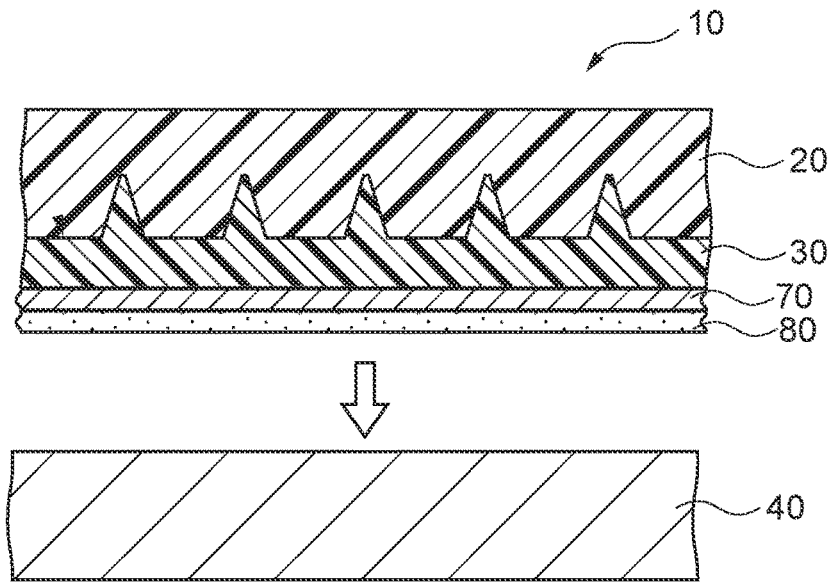
FIG. 10 is a diagram showing a step of forming a recessed and projecting shape on a to-be-transferred body using the transfer sheet for forming a recessed and projecting shape shown in FIG. 6.

Further, as shown in FIG. 10, the adhesive layer 80 of the transfer sheet for forming a recessed and projecting shape 10 is directly attached to the surface of the to-be-transferred body 40 using the transfer sheet for forming a recessed and projecting shape 10 shown in FIG. 6. Note that, for example, after that, the water-soluble resin layer 20 of the transfer sheet for forming a recessed and projecting shape 10 may be removed to leave the water-insoluble resin layer 30 on the surface of the to-be-transferred body 40 and expose a recessed and projecting shape formed by the water-insoluble resin layer 30 on the surface of the to-be-transferred body 40, although not shown.

Although the water-insoluble resin layer 30 formed of a coating material has been described in these examples, a water-insoluble resin layer may be formed of polyurethane or an acrylic resin, or a water-insoluble resin layer may be formed of a resin obtained by curing a UV curable resin composition. Further, the support layer 50 and a layer for improving slippage may be provided on the water-soluble resin layer 20 shown in FIGS. 7(a) to 10.

Example 1

The present invention will be more specifically described below by way of Example, but the present invention is not limited to the following Examples. It goes without saying that modifications of the content of the Examples without departing from the essence of the present invention are included in the present invention.

First, the results of an experiment conducted to evaluate the "solubility" and "workability for recesses and projections" of the water-soluble resin layer 20 are shown below.

In this experiment, the following composition containing polyvinylalcohol (PVA) and polyvinylpyrrolidone (PVP) was used as the material of a water-soluble resin sheet forming the water-soluble resin layer 20 of the transfer sheet for forming a recessed and projecting shape 10. A latex was added thereto in some cases. Further, a dye was added.

PVA: "PVA-117" KURARAY POVAL28-98 KURARAY CO., LTD.
"PVA-205" KURARAY POVAL5-88 KURARAY CO., LTD.
"PVA-217" KURARAY POVAL22-88 KURARAY CO., LTD.

TABLE 1

| | Degree of polymerization | Degree of saponification |
|---|---|---|
| PVA-117 | 1700 | 98.0 to 99.0 |
| PVA-205 | 500 | 86.5 to 89.0 |
| PVA-217 | 1700 | 87.0 to 89.0 |

PVP: "K15" Polyvinylpyrrolidone K15 Tokyo Chemical Industry Co., Ltd.
"K30" Polyvinylpyrrolidone K30 Tokyo Chemical Industry Co., Ltd.
"K90" Polyvinylpyrrolidone K95 Tokyo Chemical Industry Co., Ltd.

TABLE 2

| | Degree of polymerization |
|---|---|
| K15 | 90 |
| K30 | 360 |
| K90 | 3243 |

Latex: styrene-butadiene latex "LX407S6" ZEON CORPORATION
Plasticizer: "Glycerin" Tokyo Chemical Industry Co., Ltd.
Dye: "Asid Red 18" Tokyo Chemical Industry Co., Ltd.

1. a Water-Soluble Resin Sheet was Produced as Follows.

(1) After PVA particles were added to distilled water and heated to 90° C. for complete dissolution, this solution was cooled to room temperature and PVP particles and a latex were sequentially added thereto and mixed. Further, a trace amount of dye was added to color the solution, thereby preparing an aqueous solution.

(2) The obtained aqueous solution was applied using a bar coater and dried at room temperature to obtain a film (water-soluble resin sheet) having a thickness of 100 μm.

2. Method of Evaluating Solubility (1) The film thickness of the water-soluble resin sheet cut to 2×3 cm was measured by a thickness meter in the range of 2 cm square excluding the margins to be fixed by a jig.

(2) Eight hundred ml of distilled water was placed in a 1 L beaker, the water-soluble resin sheet of 2 cm square fixed to a jig was immersed in the distilled water stirred with a stirrer (600 rpm) while maintaining 25° C., and the time from immersion to dissolution was measured. The dissolution here means a state of insoluble fine particles having a diameter of 1 mm or less.

3. Method of Evaluating Workability for Recesses and Projections (1) A mold in which projecting portions of a recessed and projecting shape have been processed (corresponding to the heating recessed/projecting roller 3) were heated to 130° C. in an oven. The projecting portions are grooves in which 20 isosceles triangles having a height of 50 μm and an apex angle of 45 degrees are arranged in parallel, and the interval between the grooves are 100 μm.

(2) The mold was taken out of the oven and pressed against a water-soluble resin sheet at 50 kgf/cm to process recessed portions.

(3) The cross-sectional evaluation regarding the degree of transfer of the recesses and projections to the water-soluble resin sheet was performed using a Dino-lite.

The evaluation results are shown in Table 3.

TABLE 3

| No | | 1 | 2 | 3 | 4 | 5 | 6 | 7 |
|---|---|---|---|---|---|---|---|---|
| PVA | Product name | 205 | 205 | 205 | 205 | 205 | 217 | 205 |
| | Degree of polymerization | 500 | 500 | 500 | 500 | 500 | 1700 | 500 |
| | Degree of saponification | 88 | 88 | 88 | 88 | 88 | 88 | 88 |
| PVP | Product name | K15 | K30 | K30 | K30 | K30 | K30 | — |
| | Degree of polymerization | 90 | 360 | 360 | 360 | 360 | 360 | — |
| | PVA/PVP | 1/1 | 1/1 | 1/1 | 1/1 | 1/1 | 1/1 | 10/0 |
| Latex | % | 0 | 0 | 10 | 40 | 60 | 0 | 0 |
| Plasticizer | % | 0 | 0 | 0 | 0 | 0 | 0 | 0 |
| Solubility | | ○ | ○ | ○ | ○ | Δ | Δ | X |
| | s/μm | 0.5 | 0.4–0.5 | 0.5–0.6 | 0.5–0.6 | 0.5–0.6 | 1.1 | 1.5 |
| Hygroscopicity | | X | ○ | ○ | ○ | ○ | | |
| Film strength during heating | | | X | ○ | ○ | ○ | | |
| Workability for recesses and projections | | | | ○ | ○ | Δ | | |

| No | | 8 | 9 | 10 | 11 | 12 | 13 |
|---|---|---|---|---|---|---|---|
| PVA | Product name | 205 | 205 | 210 | 117 | 205 | 205 |
| | Degree of polymerization | 500 | 500 | 1000 | 1700 | 500 | 500 |
| | Degree of saponification | 88 | 88 | 88 | 99 | 88 | 88 |
| PVP | Product name | K30 | K30 | K30 | K30 | K90 | K30 |
| | Degree of polymerization | 360 | 360 | 360 | 360 | 3243 | 360 |
| | PVA/PVP | 9/1 | 1/9 | 1/1 | 1/1 | 1/1 | 1/1 |
| Latex | % | 0 | 0 | 40 | 40 | 10 | 0 |
| Plasticizer | % | 0 | 0 | 0 | 0 | 0 | 5 |
| Solubility | | Δ | ○ | ○ | X | ○ | ○ |
| | s/μm | 1.1 | 0.4 | 0.9 | 2 | 0.9 | 0.5–0.6 |
| Hygroscopicity | | | X | ○ | | ○ | ○ |
| Film strength during heating | | | | ○ | | ○ | ○ |
| Workability for recesses and projections | | | | ○ | | Δ | ○ |

The following conclusions were obtained from the above results.
1. Regarding PVA
   "PVA-117" has poor solubility. The degree of saponification is presumably high.
   "PVA-205" has good solubility when combined with PVP.
   "PVA-217" has improved solubility when combined with PVP but is inferior to "PVA-205".
2. Regarding Combination of "PVA-205" and PVP
(1) Combination With "K15"
   In the case where the mass ratio of "PVA-205" to "K15" is 1:1, cracking occurred by bending at 130° C.
   In the case where the mass ratio of "PVA-205" to "K15" is 1:3, hygroscopicity at room temperature is high.
(2) Combination With "K30"
   In the case where the mass ratio of "PVA-205" to "K30" is 1:1, cracking occurred by bending at 130° C.
   In the case where the mass ratio of "PVA-205" to "K30" is 1:3, hygroscopicity at room temperature is lower than that of "K15" under the same conditions.
(3) Combination With "K90"
   In the case where the mass ratio of "PVA-205" to "K90" is 1:1, solubility is inferior to those of "K15" and "K30" under the same conditions.
3. Regarding Latex
   It was found that containing a latex is effective in inhibiting cracking at 130° C. while maintaining the solubility.
   Note that the method of increasing the degree of polymerization of PVA or increasing the degree of polymerization of PVP is effective in inhibiting cracking at 130° C., but the solubility is reduced. Further, also in the case where the content of a latex or a plasticizer is too large, the ability to retain a recessed and projecting shape is reduced.
4. Conclusion
   From the above, the following conclusions were reached.
   When 10 to 40 mass % of a latex is contained with respect to PVA:PVP=1:1, better results are obtained in terms of "solubility", "film strength at 130° C.", and "workability for recesses and projections at 130° C.".

Example 2

Next, the results of an experiment conducted to evaluate the "peeling force" between a water-soluble resin layer and a support layer of a water-soluble resin sheet including a support are shown below.

In this experiment, the following polyvinylalcohol (PVA), polyvinylpyrrolidone (PVP), and latex were used as materials for a water-soluble resin sheet.
   PVA: "PVA-205" KURARAY POVALS-88 KURARAY CO., LTD.
   PVP: "K30" Polyvinylpyrrolidone K30 Tokyo Chemical Industry Co., Ltd.
   Latex: styrene/butadiene latex "LX407S6" ZEON CORPORATION
1. A water-soluble resin sheet including a support was produced as follows.
   (1) A biaxially stretched polyethylene terephthalate sheet having a thickness of 50 μm was prepared as a support for a water-soluble resin sheet, and one surface thereof was subjected to surface treatment (corona treatment at the treatment intensity of 100 W·min/m²).

(2) An aqueous solution obtained by dissolving 30 mass % of a latex in PVA:PVP=1:1 was applied to the treated surface using a bar coater, and dried at room temperature to produce a film (water-soluble resin sheet) having a thickness of 100 μm.

2. Method of Evaluating Peeling Force (1) A mold in which projecting portions of a recessed and projecting shape have been processed (corresponding to the heating recessed/projecting roller 3) was heated to 130° C. The projecting portions are grooves in which 1000 isosceles triangles having a height of 50 μm and an apex angle of 45 degrees are arranged in parallel, and the interval between the grooves are 100 μm.

(2) The mold was pressed against the surface of a water-soluble resin layer of the water-soluble resin sheet at 50 kgf/cm to form recessed portions, and the presence or absence of peeling between the water-soluble resin layer and the support layer at this time was evaluated.

The evaluation results are shown in Table 4.

TABLE 4

|  | Processing for recesses and projections at rest | Processing for recesses and projections (long) during conveying |
| --- | --- | --- |
| Without surface treatment (peeling force of approximately 1 g) | ○ Not peeled | × Peeled |
| With surface treatment (peeling force of approximately 5 g) | ○ Not peeled | ○ Not peeled |

The following conclusions were reached from the above evaluation results.

When processing and forming recesses and projections while conveying a water-soluble resin sheet including a support (long), it is possible to inhibit peeling between the water-soluble resin layer and the support layer by performing surface treatment on the support. However, considering the step of washing the water-soluble resin with water, the upper limit of the peel strength between the water-soluble resin layer and the support layer is favorably strength that allows peeling by hand.

Example 3

Further, the results of an experiment in which the water-insoluble resin layer has been changed are shown below.

In this experiment, the following polyvinylalcohol (PVA), polyvinylpyrrolidone (PVP), and latex were used as materials of a water-soluble resin sheet. Further, a dye was added.
PVA: "PVA-205" KURARAY POVAL5-88 KURARAY CO., LTD.
PVP: "K30" Polyvinylpyrrolidone K30 Tokyo Chemical Industry Co., Ltd.
Latex: styrene-butadiene latex "LX407S6" ZEON CORPORATION
Dye: GTokyo Chemical Industry Co., Ltd.

1. A water-soluble resin sheet including a support was prepared as follows.

(1) A biaxially stretched polyethylene terephthalate sheet having a thickness of 50 μm was prepared as a support for a water-soluble resin sheet, and one surface thereof was subjected to surface treatment (corona treatment at the treatment intensity of 100 W·min/m²).

(2) An aqueous solution obtained by dissolving 30 mass % of a latex in PVA:PVP=1:1 was applied to the treated surface using a bar coater, and dried at 80° C. for 15 minutes to form a coating layer having a thickness of 80 μm. This application operation was repeated one more time to form a coating layer having a thickness of 160 μm.

2. Processing for Recesses and Projections on Water-Soluble Resin Sheet (1) A mold in which projecting portions of a recessed and projecting shape have been processed (corresponding to the heating recessed/projecting roller 3) was heated to 130° C. The projecting portions are grooves in which 1000 isosceles triangles having a height of 50 μm and an apex angle of 45 degrees are arranged in parallel, and the interval between the grooves are 100 μm.

(2) The mold was pressed against the surface of a water-soluble resin layer of the water-soluble resin sheet at 50 kgf/cm to form recessed portions.

Example 3A-1

3. the Following was Used as a Water-Insoluble Resin.

UV curable resin: UV681 Permabond Engineering Adhesives Ltd. (viscosity: 90 mPa·s)

4. a Transfer Sheet for Forming a Recessed and Projecting Shape was Produced as Follows.

First, a base material was produced as follows (corresponding to 70 and 80 in FIG. 6).

One surface of a biaxially stretched polyethylene terephthalate sheet having a thickness of 50 μm was subjected to corona treatment at the treatment intensity of 100 W·min/m². A black striped pattern was formed on this treated surface with a UV curable ink.

Further, an adhesive sheet with a release film was attached to the surface opposite thereto.

Next, the above-mentioned UV curable resin composition was applied to the surface of the base material on which the striped pattern was formed, using a doctor blade to have a thickness of 200 μm. Subsequently, the above water-soluble resin sheet was stacked thereon and pressed for 20 seconds at a pressure of 0.03 Kg/cm². Note that the water-soluble resin sheet was stacked such that the surface on which recessed portions were formed was in contact with the UV curable resin composition.

Subsequently, the UV curable resin composition was cured with an energy of 500 mJ/cm² using a high pressure mercury lamp to obtain a cured layer.

Subsequently, heat treatment was performed at 110° C. for 20 minutes.

A transfer sheet for forming a recessed and projecting shape was produced through the above steps.

5. a Recessed and Projecting Shape was Formed as Follows.

A sample of 10 cm×10 cm was cut out from the above created transfer sheet for forming a recessed and projecting shape. The release film on the back surface of this sample on the side of the base material was peeled off, and the transfer sheet for forming a recessed and projecting shape was attached to a duralumin plate via the adhesive layer. A spatula formed of plastic was used for the attachment.

Subsequently, the support for a water-soluble resin sheet on the surface was peeled off.

After that, the water-soluble resin sheet on the surface was removed by washing with water. The washing with water was performed by a method of spraying tap water onto the surface of the water-soluble resin sheet. The removal of the water-soluble resin sheet was visually confirmed.

A recessed and projecting shape was formed through the above steps.

Observation of the formed recessed and projecting shape with an optical microscope revealed that there was no damage such as clipping and the shape of the recessed portions was correctly reproduced.

Example 3A-2

An Example 3A-2 was carried out in the same manner as in the Example 3A-1 except that the UV curable resin composition was changed as follows. When the UV curable resin composition was applied onto the base material, a favorable recessed and projecting shape similar to that in the Example 3A-1 could be obtained except that end portions thereof were spread and the thickness of the portions was reduced.

UV curable resin composition
    Viscosity of approximately 10 mPa·s
    1, 10-decanediol diacrylate 80 mass part
    Tripropylene glycol diacrylate 20 mass part
    Photoinitiator Irgacure 907 6 mass part

Example 3A-3

When an Example 3A-3 was carried out in the same manner as in Example 3A-1 except that the UV curable resin composition was changed as follows, a favorable recessed and projecting shape similar to that in the Example 3A-1 could be obtained.

UV curable resin composition
    Viscosity of approximately 35 mPa·s
    Polyethylene glycol #400 dimethacrylate 60 mass part
    2-hydroxy-3-acryloyloxypropylmethacrylate 30 mass part
    Polyethylene glycol #200 diacrylate 10 mass part
    Photoinitiator Irgacure 907 6 mass part

Example 3A-4

An Example 3A-4 was carried out in the same manner as in Example 3A-1 except that the UV curable resin composition was changed as follows, a favorable recessed and projecting shape similar to that in the Example 3A-1 could be obtained.

UV curable resin composition
    Viscosity of approximately 300 mPa·s
    Ethoxylated pentaerythritol tetraacrylate 80 mass part
    Ethoxyglycerin triacrylate 20 mass part
    Photoinitiator Irgacure 907 6 mass part

Example 3A-5

When an Example 3A-5 was carried out in the same manner as in Example 3A-1 except that the UV curable resin composition was changed as follows, a favorable recessed and projecting shape similar to that in the Example 3A-1 could be obtained.

UV curable resin composition
    Viscosity of approximately 700 mPa·s
    Ethoxylated bisphenol A dimethacrylate 20 mass part
    Pentaerythritol triacrylate 80 mass part
    Photoinitiator Irgacure 907 6 mass part

Example 3A-6

When an Example 3A-6 was carried out in the same manner as in Example 3A-1 except that the UV curable resin composition was changed as follows and the water-soluble resin sheet was stacked and pressed at a pressure of 0.06 Kg/cm$^2$ for 30 seconds, a favorable recessed and projecting shape similar to that in the Example 3A-1 could be obtained.

UV curable resin composition
    Viscosity of approximately 1500 mPa·s
    Ethoxylated bisphenol A diacrylate 80 mass part
    Ethoxylated isocyanurate triacrylate 10 mass part
    Dipentaerythritol polyacrylate 10 mass part
    Photoinitiator Irgacure 907 6 mass part

Example 3A-7

A transfer sheet for forming a recessed and projecting shape was produced in the same manner as in the Example 3A-1.

Subsequently, a sheet of paper (sliding layer) having a basis weight of 70 g/m$^2$ was attached to the surface of the transfer sheet for forming a recessed and projecting shape on the side of the support for a water-soluble resin sheet via an adhesive.

After that, a recessed and projecting shape was formed in the same manner as in the Example 1. When attaching the transfer sheet for forming a recessed and projecting shape to a duralumin plate, the slippage of a spatula formed of plastic was favorable and workability was good.

Observation of the formed recessed and projecting shape with an optical microscope revealed that there was no damage such as clipping and the shape of the recessed portions was correctly reproduced.

Example 3A-8

Both surfaces of a biaxially stretched polyethylene terephthalate sheet having a thickness of 50 μm as a support for a water-soluble resin sheet were subjected to corona treatment at the treatment intensity of 100 W·min/m$^2$.

The following coating liquid was applied to one of these surfaces such that the dry application amount was 18 g/m$^2$ and dried at 120° C. for 20 minutes to form a coating layer (sliding layer).

Coating liquid for coating layer
    VYLONAL MD1245 (water-based polyester resin manufactured by TOYOBO CO., LTD. Concentration of 30%) 30 mass part
    Acrylic fine particles MX2000 (manufactured by Soken Chemical & Engineering Co., Ltd., particle size of 20 μm) 8 mass part
    Pure water was added to obtain 100 g.

Subsequently, a water-soluble resin sheet was formed on the surface opposite thereto in the same manner as in the Example 3A-1.

A recessed and projecting shape was formed using this water-soluble resin sheet in the same manner as in the Example 3A-1. When attaching the transfer sheet for forming a recessed and projecting shape to a duralumin plate, the slippage of a spatula formed of plastic was favorable and workability was good.

Observation of the formed recessed and projecting shape with an optical microscope revealed that there was no damage such as clipping and the shape of the recessed portions was correctly reproduced.

Example 3A-9

An Example 3A-9 was carried out in the same manner as in Example 3A-1 except that brilliant blue was not added to the water-soluble resin sheet.

Attention was paid to the fact that the degree of removal was difficult to visually determine when removing the water-soluble resin sheet by washing with water. Observation of the obtained recessed and projecting shape with an optical microscope revealed that there was no damage such as clipping and the shape of the recessed portions was correctly reproduced.

Example 3A-10

An Example 3A-10 was carried out in the same manner as in Example 3A-1 except that the application energy when curing the UV curable resin composition was set to 700 mJ/cm$^2$ and the heat treatment at 110° C. for 20 minutes after curing was not performed.

Observation of the obtained recessed and projecting shape with an optical microscope revealed that, there was no damage such as clipping and the shape of the recessed portions was correctly reproduced.

Example 3A-11

An Example 3A-11 was carried out in the same manner as in Example 3A-1 except that a recessed and projecting shape was formed via a water-insoluble resin layer.

The UV curable resin composition according to the Example 3A-1 was stacked on the surface of a water-soluble resin sheet cut out to 10 cm×10 cm on which recessed portions were formed to prepare a transfer sheet for forming a recessed and projecting shape, and then, the transfer sheet for forming a recessed and projecting shape was attached to a duralumin plate. Subsequently, the UV curable resin composition was cured with an energy of 500 mJ/cm$^2$ using a high pressure mercury lamp. The operations after that were performed in the same manner as in the Example 3A-1 to carry out the Example 3A-11.

Observation of the obtained recessed and projecting shape with an optical microscope revealed that, there was no damage such as clipping and the shape of the recessed portions was correctly reproduced.

Example 3B-1

The UV curable resin composition was changed to the following polyurethane resin.
3. the Following was Used as a Water-Insoluble Resin.
    Aerodur 3002 Clear Coat (Akzo Nobel N.V.)
4. a Transfer Sheet for Forming a Recessed and Projecting Shape was Prepared as Follows.

The above-mentioned polyurethane resin was applied to a water-soluble resin layer including recesses and projections on a first surface thereof using a doctor blade to have a thickness of 20 µm and cured by natural drying for 12 hours to obtain a cured layer, thereby preparing a transfer sheet for forming a recessed and projecting shape.
5. a Recessed and Projecting Shape was Formed as Follows.

A sample of 10 cm×10 cm was cut out from the above created transfer sheet for forming a recessed and projecting shape. The above-mentioned polyurethane resin was applied to the surface of this sample on the side of the water-insoluble resin layer using a doctor blade to have a thickness of 20 µm and attached to a duralumin plate. A spatula formed of plastic was used for the attachment.

Subsequently, when the water-soluble resin sheet was removed by washing with water in the same manner as in the Example 3A-1, a favorable recessed and projecting shape similar to that in the Example 3A-1 could be obtained.

Example 3B-2

When an Example 3B-2 was carried out in the same manner as in the Example 3B-1 except that the polyurethane resin was changed as follows, a favorable recessed and projecting shape similar to that in the Example 3B-1 could be obtained.
    Aerodur 3001 Base Coat (Akzo Nobel N.V.)

Example 3B-3

When an Example 3B-3 was carried out in the same manner as in the Example 3B-1 except that the polyurethane resin was changed as follows, a favorable recessed and projecting shape similar to that in the Example 3B-1 could be obtained.
    Desothane HD 9008 Buffable Clear Coat (PPG Industries, Inc.)

Example 3B-4

An Example 3B-4 was carried out using the polyurethane resin according to the Example 3B-1 except that a recessed and projecting shape was formed via an adhesive layer.
4. a Transfer Sheet for Forming a Recessed and Projecting Shape was Prepared as Follows.

The above-mentioned polyurethane resin was applied to a water-soluble resin layer including recesses and projections on a first surface thereof using a doctor blade to have a thickness of 20 µm and cured by natural drying for 12 hours to obtain water-insoluble resin layer, and then, an adhesive sheet with a release film was attached thereto, thereby preparing a transfer sheet for forming a recessed and projecting shape.
5. a Recessed and Projecting Shape was Formed as Follows.

A sample of 10 cm×10 cm was cut out from the above created transfer sheet for forming a recessed and projecting shape. The release film on the back surface of this sample on the side of the base material was peeled off, and the transfer sheet for forming a recessed and projecting shape was attached to a duralumin plate via the adhesive layer. A spatula formed of plastic was used for the attachment.

Subsequently, the support for a water-soluble resin sheet on the surface was removed.

After that, the water-soluble resin sheet on the surface was removed by washing with water. The washing with water was performed by a method of spraying tap water onto the surface of the water-soluble resin sheet. The removal of the water-soluble resin sheet was visually confirmed.

Observation of the obtained recessed and projecting shape with an optical microscope revealed that, there was no damage such as clipping and the shape of the recessed portions was correctly reproduced.

Example 3B-5

A transfer sheet for forming a recessed and projecting shape was produced in the same manner as in the Example 3B-4.

Subsequently, a sheet of paper (sliding layer) having a basis weight of 70 g/m$^2$ was attached to the surface of the transfer sheet for forming a recessed and projecting shape on the side of the support for a water-soluble resin sheet via an adhesive.

After that, a recessed and projecting shape was formed in the same manner as in the Example 3B-4. When attaching the transfer sheet for forming a recessed and projecting shape to a duralumin plate, the slippage of a spatula formed of plastic was favorable and workability was good.

Observation of the formed recessed and projecting shape with an optical microscope revealed that, there was no damage such as clipping and the shape of the recessed portions was correctly reproduced.

Example 3B-6

Both surfaces of a biaxially stretched polyethylene terephthalate sheet having a thickness of 50 μm as a support for a water-soluble resin sheet were subjected to corona treatment at the treatment intensity of 100 W·min/m$^2$.

The following coating liquid was applied to one of these surfaces such that the dry application amount was 18 g/m$^2$ and dried at 120° C. for 20 minutes to form a coating layer (sliding layer).

Coating liquid for coating layer
VYLONAL MD1245 (water-based polyester resin manufactured by TOYOBO CO., LTD. Concentration of 30%) 30 mass part
Acrylic fine particles MX2000 (manufactured by Soken Chemical & Engineering Co., Ltd., particle size of 20 μm) 8 mass part
Pure water was added to obtain 100 g.

Subsequently, a water-soluble resin sheet was formed on the surface opposite thereto in the same manner as in the Example 3.

A recessed and projecting shape was formed using this water-soluble resin sheet in the same manner as in the Example 3B-4. When attaching the transfer sheet for forming a recessed and projecting shape to a duralumin plate, the slippage of a spatula formed of plastic was favorable and workability was good.

Observation of the formed recessed and projecting shape with an optical microscope revealed that, there was no damage such as clipping and the shape of the recessed portions was correctly reproduced.

Others

In the case where the present invention is applied to an aircraft, assumption is made that the aircraft is placed in a dock for maintenance and the application work according to the present invention is performed. In accordance with the present invention, it is possible to shorten the working days and reduce the cost required for the application work. Further, since the working days can be shortened, it is possible to reduce the influence on the flight schedule.

It goes without saying that the present invention is not limited to the above embodiment and can be modified in various ways.

The present invention is applicable not only to an airframe of an aircraft but also to transportation fields such as a body of an automobile, a hull surface of a ship, a propeller surface, a rocket, and a train. Further, the present invention is also applicable to sports involving high speed such as skiing and sports fields such as swimming, and to skis, a ski wear, a swimwear, and the like. Further, the present invention is also applicable to a pipeline through which fluid flows. Further, the present invention is also applicable to a windmill that is a rotating object.

REFERENCE SIGNS LIST

2: water-soluble resin sheet
3: heating recessed/projecting roller
6: coating material
10: transfer sheet for forming recessed and projecting shape
11: roll winding of transfer sheet for forming recessed and projecting shape
20: water-soluble resin layer
21: first surface
22: recesses and projections
30: water-insoluble resin layer
32: recesses and projections
40: to-be-transferred body
41: coating material
50: support layer
60: adhesive layer
70: base material
80: adhesive layer

The invention claimed is:

1. A transfer sheet for forming a recessed and projecting shape, comprising:
a water-soluble resin layer that is formed of a water-soluble resin whose dissolving time in distilled water at 25° C. is 0.2 s/μm or more and 1.0 s/μm or less and includes recesses and projections on a first surface thereof; and
a water-insoluble resin layer that is stacked on the first surface,
wherein the water-soluble resin layer contains a latex.

2. The transfer sheet for forming a recessed and projecting shape according to claim 1, wherein
the water-soluble resin layer contains a plasticizer.

3. The transfer sheet for forming a recessed and projecting shape according to claim 2, wherein
the water-soluble resin layer contains 2 mass % or more and 10 mass % or less of a plasticizer.

4. The transfer sheet for forming a recessed and projecting shape according to claim 1, which is a long sheet wound into a roll.

5. The transfer sheet for forming a recessed and projecting shape according to claim 1, further comprising
a support layer stacked on a surface of the water-soluble resin layer opposite to the first surface,
a peel strength between the support layer and the water-soluble resin layer being 2 g/cm or more and 70 g/cm or less.

6. The transfer sheet for forming a recessed and projecting shape according to claim 5, further comprising
a sliding layer on a surface of the support layer opposite to a surface that is in contact with the water-insoluble resin layer.

7. The transfer sheet for forming a recessed and projecting shape according to claim 1, further comprising
an adhesive layer stacked on a surface of the water-insoluble resin layer on a side opposite to a surface thereof facing the first surface of the water-soluble resin layer.

8. A transfer sheet for forming a recessed and projecting shape, comprising:
a water-soluble resin layer that is formed of a water-soluble resin whose dissolving time in distilled water at 25° C. is 0.2 s/μm or more and 1.0 s/μm or less and includes recesses and projections on a first surface thereof; and
a water-insoluble resin layer that is stacked on the first surface,
wherein the water-soluble resin contains polyvinylalcohol and polyvinylpyrrolidone, and a total mass of polyvinylalcohol and polyvinylpyrrolidone is 40 mass % or more and less than 100 mass % with respect to a total amount of the water-soluble resin.

9. The transfer sheet for forming a recessed and projecting shape according to claim 8, wherein
the water-soluble resin has a degree of polymerization of polyvinylalcohol of 250 or more and 1000 or less and a degree of polymerization of polyvinylpyrrolidone of 100 or more and 2000 or less.

10. The transfer sheet for forming a recessed and projecting shape according to claim 8, wherein
the water-soluble resin has a mass ratio of polyvinylalcohol to polyvinylpyrrolidone in a range of 80:20 to 20:80.

11. The transfer sheet for forming a recessed and projecting shape according to claim 8, wherein
the water-soluble resin has a degree of saponification of the polyvinylalcohol of 70% or more and 99% or less.

12. A transfer sheet for forming a recessed and projecting shape, comprising:
a water-soluble resin layer that is formed of a water-soluble resin whose dissolving time in distilled water at 25° C. is 0.2 s/μm or more and 1.0 s/μm or less and includes recesses and projections on a first surface thereof; and
a water-insoluble resin layer that is stacked on the first surface,
wherein the water-soluble resin layer contains 2 mass % or more and 50 mass % or less of a latex.

13. A method of producing the transfer sheet for forming a recessed and projecting shape according to claim 1, comprising the steps of:
preparing the water-soluble resin layer that includes recesses and projections on the first surface;
forming a water-insoluble resin layer on the first surface.

14. The method of producing the transfer sheet for forming a recessed and projecting shape according to claim 13, further comprising the steps of:
feeding a roll-shaped water-soluble resin sheet forming the water-soluble resin layer; and
transferring recesses and projections to a first surface of the fed water-soluble resin sheet using a heating recessed/projecting roller.

15. The method of producing the transfer sheet for forming a recessed and projecting shape according to claim 13, further comprising the step of
winding, after forming a water-insoluble resin layer on the first surface, the transfer sheet for forming a recessed and projecting shape into a roll.

16. The method of producing the transfer sheet for forming a recessed and projecting shape according to claim 13, comprising the steps of:
preparing a support;
performing surface treatment on the support layer; and
stacking the water-soluble resin layer on a surface of the support that has been subjected to the surface treatment.

17. The method of producing the transfer sheet for forming a recessed and projecting shape according to claim 13, further comprising the step of
stacking an adhesive layer on a surface of the water-insoluble resin layer on a side opposite to a surface thereof facing a first surface of the water-soluble resin layer.

18. The method of producing the transfer sheet for forming a recessed and projecting shape according to claim 13, wherein
the water-insoluble resin layer is formed of a coating material, and
the step of forming a water-insoluble resin layer on the first surface includes
a step of stacking a coating liquid of the coating material on the first surface, and
a step of drying the coating liquid to form the water-insoluble resin layer on a first surface of the water-soluble resin layer.

19. The method of producing the transfer sheet for forming a recessed and projecting shape according to claim 13, wherein
the water-insoluble resin layer is formed of a resin obtained by curing a UV curable resin composition, and
the step of forming a water-insoluble resin layer on the first surface includes
a step of stacking a coating liquid of the UV curable resin composition on the first surface, and
a step of curing the coating liquid to form the water-insoluble resin layer that is formed a resin obtained by curing the UV curable resin composition on a first surface of the water-soluble resin layer.

20. A method of forming a recessed and projecting shape, comprising the steps of:
attaching the transfer sheet for forming a recessed and projecting shape according to claim 1 on a side of the water-insoluble resin layer to a surface of a to-be-transferred body; and
removing the water-soluble resin layer of the transfer sheet for forming a recessed and projecting shape attached to the surface of the to-be-transferred body to leave the water-insoluble resin layer on the surface of the to-be-transferred body and expose a recessed and projecting shape formed by the water-insoluble resin layer on the surface of the to-be-transferred body.

* * * * *